Feb. 17, 1942.　　　E. E. WESTBERG　　　2,273,679
VALVE DEVICE
Filed March 30, 1940
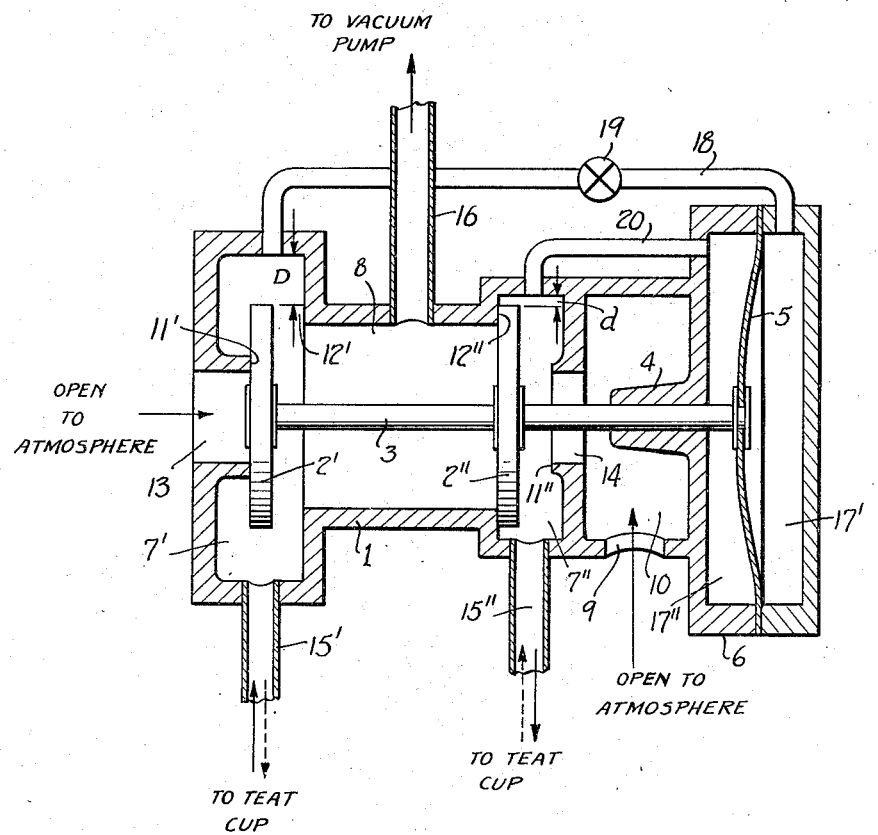
INVENTOR
Ewald Eugen Westberg
BY
James C. Marble
his ATTORNEY Patented Feb. 17, 1942

2,273,679

UNITED STATES PATENT OFFICE 2,273,679

VALVE DEVICE

Evald Eugén Westberg, Stockholm, Sweden, assignor to Svenska Aktiebolaget Gasaccumulator, Stockholm, Sweden, a corporation of Sweden Application March 30, 1940, Serial No. 326,979
In Sweden May 12, 1938

4 Claims. (Cl. 137—145)

In several technical fields, use is made of valve mechanisms which will periodically change the flowing direction and/or the flow passage of a gaseous or liquid flowing medium (hereinafter termed "a fluid medium"). For milking machines, for instance, a valve called a pulsator is used, by means of which the teat-cups are alternately connected with a vacuum apparatus and with the atmosphere. In a known type of pulsator, the control of the air current is effected by means of disc valves, the movement of which is periodically reversed under influence of air pressure, so that the valves are alternately brought into two limit positions. It has been found, however, that the valves of a pulsator of this kind get into a neutral position in which they cannot be brought into either of the limit positions by the air, and therefore remain immovable. This fault is especially noticeable since it can happen when the pulsator is at rest, and it renders starting impossible.

The present invention is intended to eliminate the disadvantage mentioned, and to provide a pulsator or like valve mechanism in which the valves are arranged to move towards one of their limit positions when starting.

According to the invention there is provided a valve mechanism for periodically changing the flowing direction and/or the flow passage of a fluid medium, preferably in pulsators for milking machines, containing at least two connected disc valves which are movably arranged in a casing in such a way that they can be brought into two limit positions, and characterized in that the cross-sectional area of the space between the circumference of one valve and the casing is greater than the same area between the other valve and the casing, so that when starting the mechanism the difference in pressure between the two sides of each valve, caused by the passage of the medium through the said spaces will ensure that the valves move into one of their limit positions.

In the following description the invention will be described in detail, by way of example only, with reference to the accompanying drawing, which shows a vertical longitudinal section of a pulsator constructed according to the invention.

In a valve casing 1 a spindle 3, supporting two valve discs 2' and 2", is arranged in bearings in guide 4. The one end of the spindle is attached to a diaphragm 5, situated in the section 6 of the valve casing, which serves as a diaphragm casing. The valve casing is also provided with two chambers 7' and 7", another chamber 8, situated between the said chambers, and finally, a chamber 10, situated between the chamber 7" and the diaphragm casing, and by means of an opening 9, in permanent communication with the atmosphere. The side walls of the chambers 7' and 7", in which the valves 2' and 2" are fitted, are arranged to serve as valve seats 11', 12' and 11", 12" respectively. The arrangement of the valves 2' and 2" on the spindle and the position of the valve seats is such that the spindle together with the valves can occupy two limit positions, in either of which both valves simultaneously rest against the seats. When the spindle occupies one of its limiting positions, as shown in the figure, the valve 2' rests against the seat 11' and the valve 2" against the seat 12". In the other position, the valve 2' rests against the seat 12' and the valve 2" against the seat 11". The seat 11' is arranged in such a way that a by-pass conduit 13 between the chamber 7' and the atmosphere is closed, when the valve 2' rests against the seat 11'. In the same way, an opening 14 in the wall between the chamber 7" and the chamber 10, which is in permanent communication with the atmosphere, is closed when the valve 2" rests against the seat 11". When the valve 2' rests against the seat 12', the chamber 7' is brought out of communication with the chamber 8. When the valve 2" rests against the seat 12", on the other hand, the chamber 8 is out of communication with the chamber 7". When the spindle occupies a medium position, so that the valves do not rest against the seats, the chambers 7' and 7" are each in communication with the atmosphere, on the one side, and with the chamber 8 on the other side.

Each one of the chambers 7' and 7" are connected with a teat-cup, not shown in the figure, by means of conduits 15', 15", and the chamber 8 is brought into communication with a vacuum pump, not shown, by means of a conduit 16.

The diaphragm casing is divided into two sections 17' and 17" by means of the diaphragm 5, of which the former is connected with the chamber 7' through a small duct 18, in which a throttle valve 19 is arranged, and the latter is in communication with the chamber 7" through a duct 20. The spindle 3 has a fluid-tight fit in the guide 4 in such a way that the chambers formed by the sections of the diaphragm casing are completely closed, apart from the ducts 18 and 20.

The two valves 2' and 2" are preferably circular in shape and the chambers 7', 8 and 7" have circular cross section. The valves have both the same diameter, whereas the diameter of the chamber 7' is greater than that of the chamber 7", so that the annular space D formed between the periphery of the valve 2' and the wall of the chamber 7' is larger than the corresponding space d between the periphery of the valve 2" and the wall of the chamber 7".

The valves operate as follows: When the spindle 3 is brought into the position shown in the figure in which the valves 2' and 2" rest against the seats 11' and 12", respectively, the chambers 7' and 8 are in communication with one another, whereas the chamber 8 is out of communication with the chamber 7", the chamber 7' being closed from the atmosphere. Consequently, the air current will pass from the teat-cup connected with the conduit 15', through the said conduit, the chambers 7' and 8 and the conduit 16 to the vacuum pump, so that vacuum will prevail in the chambers 7' and 8. The teat-cup connected with the conduit 15" on the other hand is in communication with the atmosphere through the last mentioned conduit, the chamber 7", the opening 14, the chamber 10, and the opening 9. Atmospheric pressure wil thus prevail in the chamber 7". From the existing differences in pressure it is evident that the force acting upon the valve 2" towards the seat 12" is greater than the force acting upon the valve 2' in the direction away from the seat 11', this latter seat being smaller in diameter than the seat 12". This means that the resultant force, by means of which the valves are pressed against the seats 11' and 12", is equal to the difference between the said forces, if friction is ignored.

Owing to the vacuum prevailing in the chamber 7', however, the air in the chamber 17' of the diaphragm casing will finally flow through the duct 18 and the throttle valve 19 to the said chamber, so that a vacuum is produced in the chamber 17', whereas atmospheric pressure is still prevailing in the chamber 17" on the other side of the diaphragm 5, as chamber 17" is connected with the chamber 7" through the duct 20. The diaphragm will thus be acted upon by a force tending to pull the valve spindle 3 to the right, so that the valves tend to leave their seats. When this force is great enough to overcome the resultant force pressing the valves against their seats, the spindle is suddenly moved to the right, so that the valve 2" will rest against the seat 11", and the valve 2' against the seat 12'.

In this new position of the spindle the chamber 7' will be put into communication with the atmosphere, but is closed from the chamber 8, whereas the latter chamber will be in communication with the chamber 7", which in its turn will be put out of communication with the atmosphere. Vacuum will then be produced in the chambers 8 and 7", the conduit 15", and the teat-cup connected to same. On the other hand, air from the atmosphere will flow into the other teat-cup, through the opening 13, the chamber 7' and the conduit 15'.

Through the duct 20 vacuum is also produced in the chamber 17". As the diameter of the seat 11" is smaller than that of the seat 12', the spindle is forced to the right, so that the valves are pressed against the seats. The vacuum remaining in the chamber 17', since the former position of the spindle, will be brought up to atmospheric pressure at a velocity depending upon the throttling in the valve 19, as air from the chamber 7' enters into the chamber 17'. When the pressure in the chamber 17' is sufficiently high to overcome the resultant force by means of which the valves are pressed against their seats, the spindle will be moved to the left, thus resuming the position shown in the figure. The conduit 15' will then be put under vacuum again, and atmospheric air will enter into the conduit 15" whereupon the process now described is repeated.

The conduits 15' and 15" are thus alternately put under atmospheric pressure and vacuum, which makes it possible to perform the milking procedure.

Supposing that the valves 2' and 2", at the starting of the apparatus, do not make contact with the seats, as was first presumed, but instead occupy a position between the seats, air from the atmosphere will flow through the openings 13 and 14, passing the valves through the space between the periphery of the valves and the walls of the valve casing, and further to the conduit 16. As the space surrounding the valve 2" is smaller than the one surrounding the valve 2', this current of air will cause a greater difference in pressure between the two sides of the valve 2" than between the sides of the other valve. The resultant force, caused by the air current, passing the valves, will thus be directed towards the seats 11' and 12", and the spindle will move to the left, so that the valves make contact with these seats. The apparatus will then operate as described above.

It is thus evident that the valves at the beginning cannot assume or maintain such a position that the starting is rendered impossible, but the apparatus will always be startable independent of the position of the valves at the start. In order to enable the teat-cups to obtain the same vacuum, in spite of the throttle at the valve 2", a similar throttle or any other flow-resisting means may be arranged in the passage of the air through the conduit 15' or the chamber 8. However, this throttling must be arranged in such a way that it does not increase the difference in pressure between the sides of the valve 2' when the air is passing.

The invention is not confined to the embodiment described and shown here, but may also be brought into use, not only for pulsators for milking machines, but also for other purposes, when there is a need of a means of periodically changing the flowing direction and/or flow passage of a gaseous or liquid medium.

Having now particularly described and ascertained the nature of my said invention and in what manner the same is to be performed, I declare that what I claim is:

1. In a valve mechanism, a casing forming three aligned communicating chambers, shoulders forming valve seats between the center chamber and each of the end chambers, each of the end chambers being formed with a port communicating with a region in which the same fluid pressure exists, a valve member in each end chamber arranged to alternately cooperate with the seat and the port in the respective end chambers, means connecting said valve members together for simultaneous movement, means for connecting said center chamber with a region in which the fluid pressure differs from that existing in the first-mentioned region, and pressure responsive means for shifting said valve members in response to pressure changes in said end chambers, the cross-sectional area between the side edges of one of said valve members and the walls of the end chamber in which it is located being different from the corresponding space between the side edges of the other valve member and the walls of the other end chamber, to produce an unbalance in the fluid pressure acting on said connected valve members when said valve members are in an intermediate position spaced from both said valve seats and said ports.

2. In a valve mechanism, a casing, movable valve structure in said casing including two valve members connected for simultaneous movement, said casing being formed with four valve seats two of which cooperate with each of said valve members, said casing having two ports each communicating with a region in which fluid pressure exists, means connecting the interior of the casing with another region in which the fluid pressure differs from that existing in the first mentioned region, each valve when seated on one of its seats acting to close one of the ports to seal the casing against the first mentioned region, each valve when seated on the other of its seats acting to close off part of the casing from the second mentioned region, the valves acting oppositely so that when one port is closed by one valve the other port is opened by the other valve, pressure responsive means in communication with those portions of the casing which are shut off by said valves when seated on said other seats, said pressure responsive means being secured to said valve structure and responsive to the pressure differential acting on the respective valve members for moving said valve structure between two extreme positions, and means for subjecting said valve structure when in an intermediate position to an unbalance in pressure including so arranging the cross-sectional area of the space between the side edges of one of said valve members and the adjacent walls of said casing that it will be greater than the corresponding area between the other valve member and the walls of said casing adjacent thereto, whereby said unbalance of forces acting on the valve members will assure that said valve structure is shifted to one of its extreme positions.

3. In a valve mechanism, a casing, valve structure in said casing movable between two extreme positions and including two valve members connected for simultaneous movement, said casing being formed with four valve seats two of which cooperate with each of said valve members, said casing having two ports each communicating with a region in which fluid pressure exists, means connecting the interior of the casing with another region in which the fluid pressure differs from that existing in the first mentioned region, each valve when seated on one of its seats acting to close one of the ports to seal the casing against the first mentioned region, each valve when seated on the other of its seats acting to close off part of the casing from the second mentioned region, the valves acting oppositely so that when one port is closed by one valve the other port is opened by the other valve, pressure responsive means in communication with those portions of the casing which are shut off by said valves when seated on said other seats, said pressure responsive means being secured to said valve structure and responsive to variations in fluid pressure and automatically operative upon movement of said valve structure to either extreme position to shift the structure to the other extreme position, said valve structure when in an intermediate position being subjected to an unbalance in pressure including so arranging the cross-sectional area of the space between the side edges of one of said valve members and the adjacent wall of the casing that it will be different from the corresponding area between the other valve member and the walls of said casing adjacent thereto, whereby an unbalance of forces acting in opposite directions on said members when subjected to fluid flow will assure that said valve structure is shifted to one of its extreme positions.

4. Valve mechanism as set forth in claim 2, including means forming a passageway through which the fluid flows from said first mentioned region to said casing, the space between the side edges of said one of said valve members and the adjacent walls of the casing having a cross-sectional area less than the minimum cross-sectional area of said passageway.

EVALD EUGÉN WESTBERG.